(12) United States Patent
Bastide et al.

(10) Patent No.: US 9,704,135 B2
(45) Date of Patent: Jul. 11, 2017

(54) GRAPHICALLY RECOGNIZED VISUAL CUES IN WEB CONFERENCING

(75) Inventors: Paul Roger Bastide, Boxford, MA (US); Matthew E. Broomhall, South Burlington, VT (US); Robert Edward Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 12/827,094

(22) Filed: Jun. 30, 2010

(65) Prior Publication Data

US 2012/0005599 A1      Jan. 5, 2012

(51) Int. Cl.
*G06Q 10/10* (2012.01)

(52) U.S. Cl.
CPC .................................. *G06Q 10/101* (2013.01)

(58) Field of Classification Search
CPC .................................................. G06Q 10/101
USPC ............... 715/753, 751, 762, 500; 348/14.08
See application file for complete search history.

(56) References Cited

U.S. PATENT DOCUMENTS

| | | | |
|---|---|---|---|
| 6,061,602 A * | 5/2000 | Meyer ............................. | 700/83 |
| 6,509,912 B1 * | 1/2003 | Moran et al. ................. | 715/762 |
| 7,634,540 B2 * | 12/2009 | Ivashin et al. ................. | 709/204 |
| 7,664,733 B2 | 2/2010 | Erol et al. | |
| 2002/0122077 A1 * | 9/2002 | Doney et al. .................. | 345/853 |
| 2003/0043271 A1 * | 3/2003 | Dantwala ..................... | 348/207.1 |
| 2004/0114746 A1 * | 6/2004 | Caspi et al. ............. | 379/202.01 |
| 2005/0022108 A1 * | 1/2005 | Carro et al. ................... | 715/500 |
| 2005/0182617 A1 | 8/2005 | Reynar et al. | |
| 2007/0150583 A1 | 6/2007 | Asthana et al. | |
| 2007/0226606 A1 * | 9/2007 | Noyes et al. .................. | 715/512 |
| 2007/0294619 A1 | 12/2007 | Krishnaswamy et al. | |
| 2007/0300165 A1 * | 12/2007 | Haveliwala .................... | 715/758 |
| 2008/0066136 A1 * | 3/2008 | Dorai et al. ................... | 725/135 |
| 2008/0107345 A1 * | 5/2008 | Melikian ........................ | 382/209 |
| 2008/0320082 A1 * | 12/2008 | Kuhlke et al. ................ | 709/205 |
| 2010/0083351 A1 * | 4/2010 | Ryder ................. | G06F 21/6218 726/4 |
| 2011/0185297 A1 * | 7/2011 | Reid et al. ..................... | 715/765 |

* cited by examiner

*Primary Examiner* — Li Sun
(74) *Attorney, Agent, or Firm* — Steven L. Nichols; Fabian VanCott

(57) ABSTRACT

A web conferencing system includes web conferencing server for outputting a visual presentation which includes a visual cue. The visual cue is linked with an executable action. A visual robot operated by the web conferencing server graphically recognizes the visual cue when the visual presentation is displayed in a web conference, and associates the visual cue with the executable action. The executable action is then executed.

30 Claims, 8 Drawing Sheets

GRAPHICALLY RECOGNIZED VISUAL CUES IN WEB CONFERENCING

BACKGROUND

Web conferencing is a versatile tool which can be used to connect remote users through the internet. A web conference typically includes both a visual presentation and an audio stream which describes the presentation. During a web conference, the presenter or moderator may wish to coordinate a variety of actions which facilitate the participation and understanding of the users. However, the presenter may forget or overlook the desired action. The presenter may also be distracted while attempting to coordinate the actions or may not properly execute an action. Additionally, the remote users may not understand that an action has been taken, and become disoriented.

BRIEF SUMMARY

A web conferencing system includes a web conferencing server for outputting a visual presentation which includes a visual cue. The visual cue is linked with an executable action. A visual robot operated by the web conference server graphically recognizes the visual cue when the page is displayed in a web conference and associates the visual cue with the executable action. The executable action is then executed.

A method includes recognizing a visual element within a visual presentation using a visual robot operated by a web conferencing server. The visual element is then matched with an executable action using an action module. The action is then executed to alter a media stream output of the web conferencing application hosted on a web conferencing server.

A computer program product for recognizing and taking action based on visual cues in a web conferencing application includes a computer readable storage medium having a computer readable program code embodied therewith, the computer readable program code including a code which is configured to recognize a visual element within a visual presentation using a visual robot. The computer readable program code matches the visual element with an executable action using an action module and executes the action to alter a media stream output of the web conferencing application.

BRIEF DESCRIPTION OF THE SEVERAL VIEWS OF THE DRAWINGS

The accompanying drawings illustrate various embodiments of the principles described herein and are a part of the specification. The illustrative embodiments are merely examples and do not limit the scope of the claims.

Throughout the drawings, identical reference numbers designate similar, but not necessarily identical, elements.

DETAILED DESCRIPTION

Figure 1:
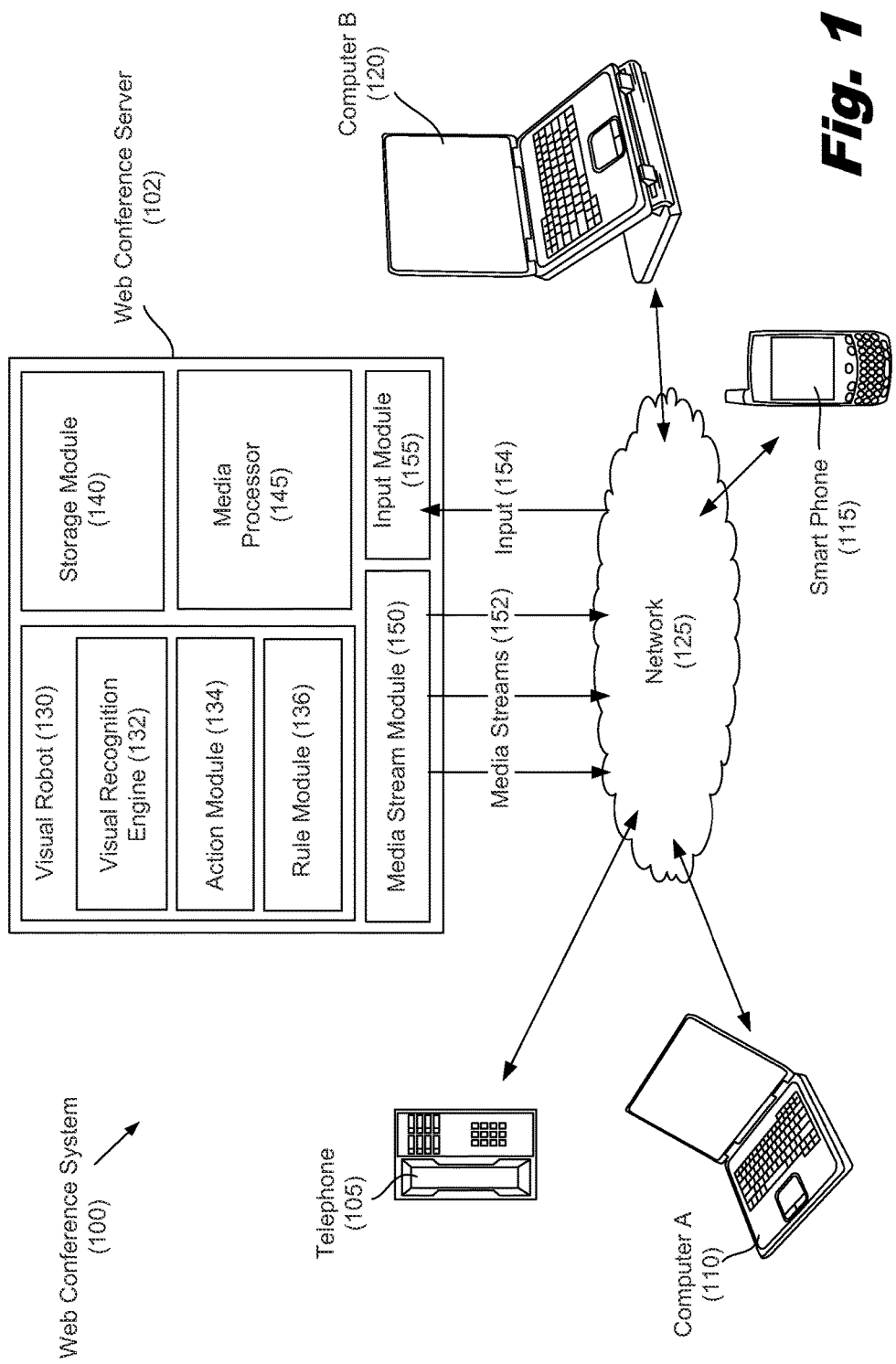
FIG. 1 is a diagram of an illustrative web conferencing system configured to recognize and act on visual cues within a presentation, according to one embodiment of principles described herein.

Web conferencing is a versatile tool which can be used to connect remote users through the internet. A web conference typically includes both a visual presentation and an audio stream which describes the presentation. During a web conference, the presenter or moderator may wish to coordinate a variety of actions which facilitate the participation and understanding of the users. These actions may include: beginning a web conference by activating the presenter's microphone and muting all the remote users microphones; opening the remote user's lines for questions; starting a poll or brainstorming session; directing the remote users to an outside resource such as a web page; coordinating schedules of the participants; creating a to-do or task list; or other actions. However, the presenter may forget or overlook the desired action. The presenter may also be distracted while attempting to coordinate the actions or may not properly execute an action. Additionally, the remote users may not understand that an action has been taken and become disoriented. For example, when a presentation shifts from a first presenter to a second presenter, the remote users may not have any indication of this change.

The present specification discloses the use of visual cues within a web conferencing environment. Visual cues are graphical and/or textual elements within a presentation which are recognizable by a visual robot. The visual robot interprets these visual cues and associates them with a particular action, series of actions, and/or rules for executing the action(s). The visual robot then executes the action or actions during the web conference. This automatic detection of the visual cues and association of the visual cues with actions ensures that the desired actions are performed during the web conference at the proper time and proper sequence. Additionally, the visual cues may be visible to all the participants in the web conference. As a result, the participants understand the actions that are being taken during the web conference and are better able to participate and follow the discussion.

The graphical nature of the visual cues make the visual cues platform independent. Consequently, the presentation can be created in using any software or other method. As long as the visual cues are present in the presentation and recognized by the visual robot, the actions can be successfully executed. According to one illustrative embodiment, a visual cue tool bar may be provided which allows a presenter to insert the visual cues into a presentation which is being created in any number of software packages. This provides a wide range of flexibility in creating and presenting presentations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as JAVA®, SMALLTALK®, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows an illustrative embodiment of a web conference system (100). In this example, the web conference system (100) includes a web conference server (102), a telephone (105), a computer A (110), a smart phone (115) and a computer B (120). These are interconnected by a network (125). The various devices connected to the network (125) are merely illustrative embodiments and are not meant to be limiting. Any device which contains the requisite interconnectivity and display functions could be used. For example, the telephone (105) could be a conferencing phone system or an individual phone. Computer A (110) and the computer B (120) could be any computer which has internet or other connectivity and is suitable for displaying web conferencing. The network (125) can include a variety of interconnection streams and protocols. For example, network (125) could include cellular networks, internet networks, phone lines, cable systems, satellite, or other interconnection technologies.

The web conference server (102) may include a number of components including those shown in FIG. 1. In this illustrative embodiment, the web conference server (102) includes an input module (155), a media processor (145), a storage module (140), a visual robot (130) and a media stream module (150). The web conference server (102) hosts a web conference application which presents a web conference presentation and provides functionality to the users participating in the web conference.

For example, the input module (155) may accept input (154) from the participants, external devices, and the network (125). Input (154) may include a variety of data including the presentation which is to be displayed by the web conference server (102), commands from the presenter, input from the participants, or other input data. The input module (155) accepts this data and passes it to other modules for storage and/or processing. The media processor (145) performs the various instructions which are used to display the web conference information. The storage module (140) may store the web conference information including various slides or animations which are involved with the web conference.

The visual robot (130) operated by the web conference server (102) analyzes the presentation to identify specific visual cues within the various slides or other visual information presented to the participants. To do this, the visual robot (130) uses a visual recognition engine (132). The visual recognition engine (132) visually analyzes the presented information for visual cues. As described above, visual cues can be a combination of geometric shapes and/or text which are specifically designed to cue the visual robot to take certain actions and/or apply certain rules. For example, the visual robot (130) may periodically capture a screen shot of the displayed slide or presentation material. This screen shot is then analyzed by the visual recognition engine (132) to determine if any of the graphical information is a visual cue. In another embodiment, the visual robot (130) may capture the visual information directly from a display data stream. For example, the visual robot (130) may interface with the media stream module (150) to capture a portion of the media stream (152) which represents a portion of the graphical presentation.

Once the visual robot (130) has recognized the various visual cues, it matches those cues to actions using the action module (134). Additionally, the visual robot (130) may also apply a number of rules to the actions to be taken. These rules are further described below and may be contained in rule module (136).

The web conference server (102) then applies the various actions according to the rules and generates media streams using media stream module (150). The media stream module (150) may generate a variety of media streams suitable for the various devices which are connected to the network (125). For example, the media streams (152) may include an audio only media stream which is received by telephone (105). The smart phone (115) may also receive the audio stream in combination with a mobile stream which contains reduced graphics and/or graphics which are specially configured to display on reduced sized screens. The mobile media streams (152) may also contain a less computationally intensive presentation to reduce the load on the smart phone (115). The computers (110, 120) may receive a more complete stream including an audio stream, video stream and the presentation graphic stream. According to one illustrative embodiment, these streams may be combined into a single media stream which is displayed on the computers (110, 120). As the presentation is being viewed by the various devices, the devices may be used to input various commands which are then returned to the web conference server (102) through the input channel (154).

Figure 2:
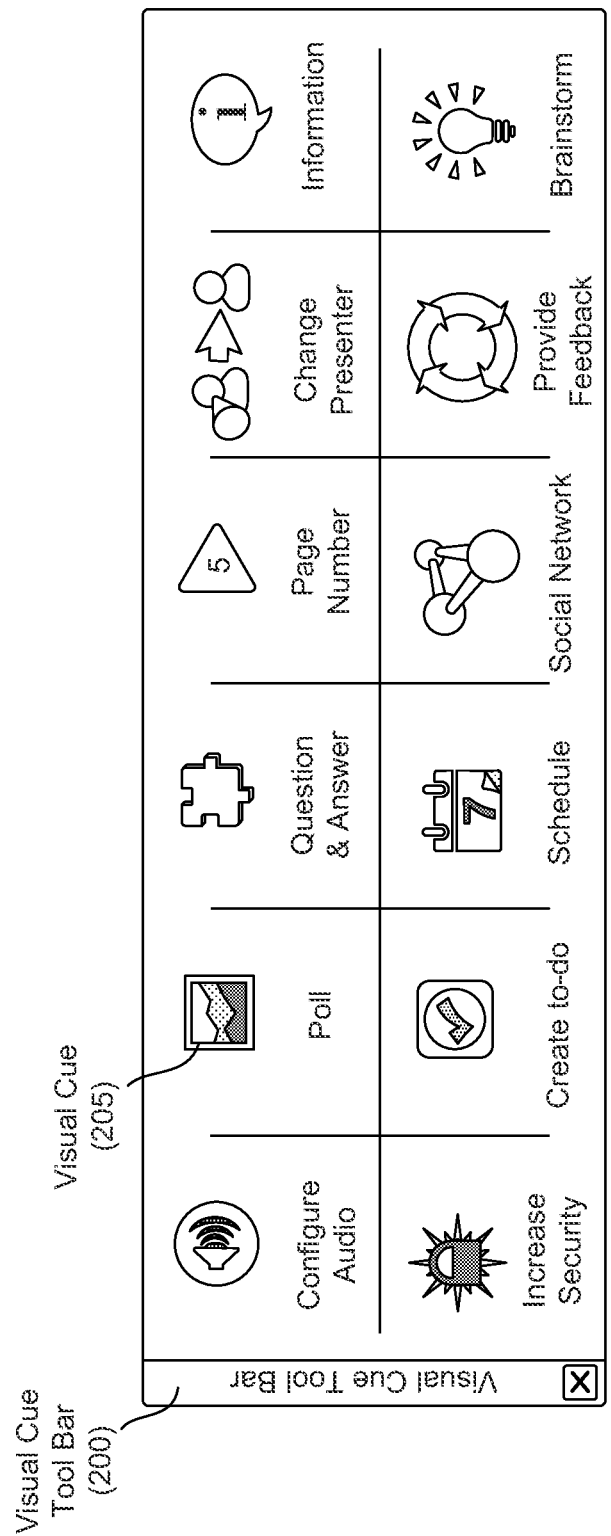
FIG. 2 is a diagram of an illustrative visual cue tool bar, according to one embodiment of principles described herein.
Figure 3:
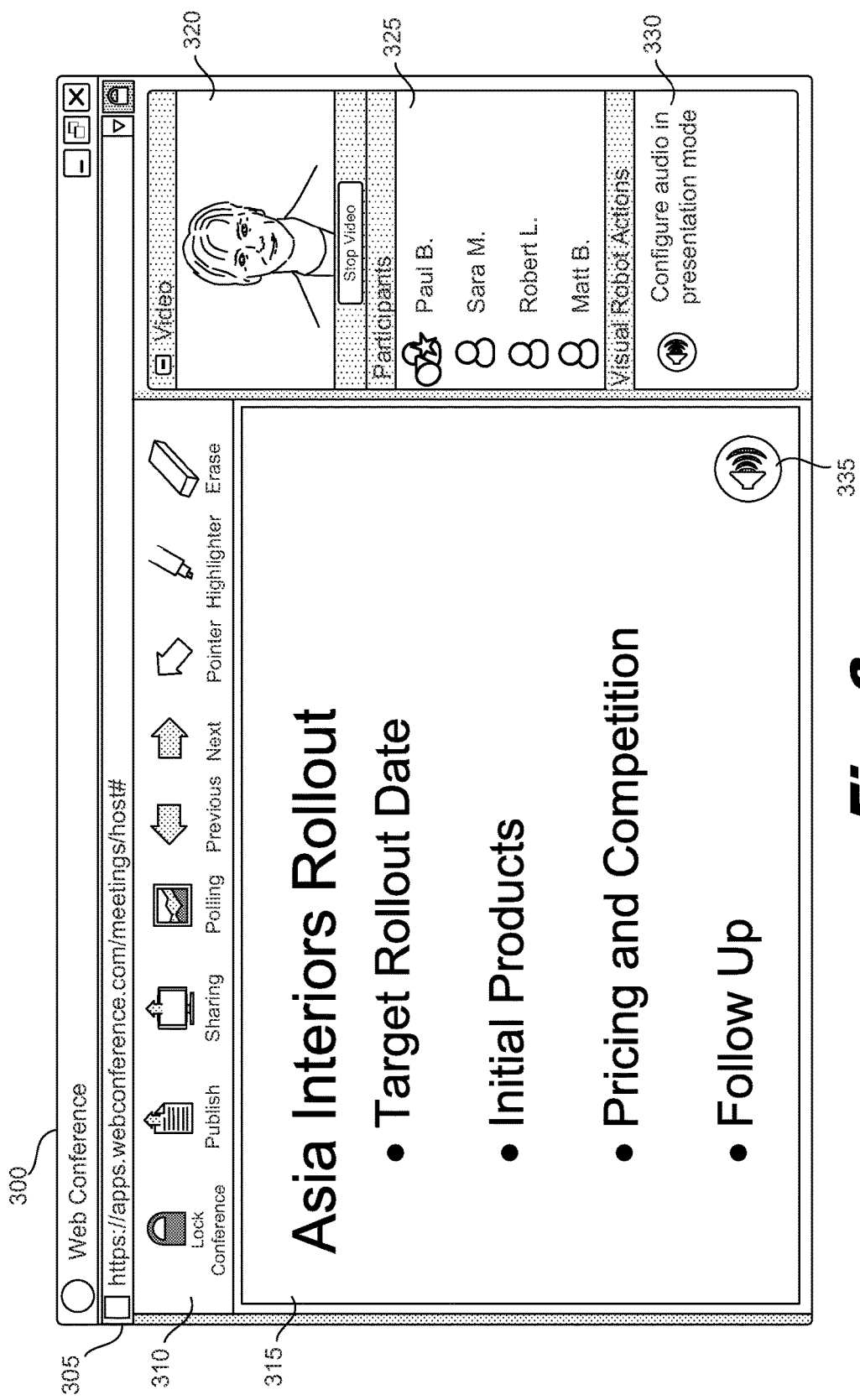
FIGS. 3-7 are illustrative screen shots of a web presentation which includes visual cues, according to one embodiment of principles described herein.

FIG. 2 shows one illustrative embodiment of a visual cue toolbar (200). According to one illustrative embodiment, the visual cue toolbar (200) may be used during the creation of the presentation to place various visual cues (205) within the presentation. As discussed above, the visual cue toolbar (200) may be a platform independent plugin which allows a presentation creator to place visual cues (205) within presentations which are created in a variety of software packages. The visual robot (130) then recognizes these visual cues and may automatically take one or more actions or apply one or more rules during the course of the presentation.

FIG. 2 shows only 12 visual cues (205). These visual cues (205) are only illustrative embodiments of visual cues. A variety of visual cues may be used which are not included in FIG. 2. For example, additional visual cues may be generated by an organization or individual to fulfill their particular needs. After creating a visual cue, the desired action may be associated with the visual cue. One of the primary characteristics of an effective visual cue is that the visual robot (130, FIG. 1) recognizes the visual cue (205) when it is presented. As discussed above, one of the advantages of using visual cues (205) in a presentation is that the visual robot (130, FIG. 1) is format agnostic. The visual robot (130, FIG. 1) scans through the presentation visually by making an analysis of the presented pixels or vector graphics. The presentation may be presented in any format including LOTUS® Symphony Presentations, Portable Document Format (pdf), POWERPOINT®, word processing document or other format. In some embodiments, a hand written presentation may even suffice if the visual cues (205) are drawn such that the visual robot (130. FIG. 1) can recognize the visual cue (205) and take the appropriate action and/or apply the appropriate rule.

In FIG. 2, a "configure audio" visual cue is shown. According to one illustrative embodiment, the "configure audio" visual cue may be used at the beginning of a presentation to turn on the microphone of the presenter and to mute the microphones of the other participants. The "configure audio" visual cue may also be configured to begin streaming the presentation through the various media streams.

The "poll" visual cue may be used to start various polling software within the web conferencing system. The polling software may present a question which is included in the slide and give various options for answers. The web conferencing server would then be looking for responses, either verbal or textual, from each of the participants to complete the poll and compile the statistics to make a decision or to present the results. The "question and answer" visual cue may be associated with a number of actions including opening the audio lines from the various participants so that the participants can ask a question and receive an answer from the presenter.

The "page number" visual cue may be used to indicate visually to the participants which page of the presentation they are on. However, for those participants who are receiving an audio only stream, it can be difficult at times to understand at which page of the presentation they should be looking. For example, a participant which is listening to the web conference over telephone (105, FIG. 1) may have the presentation printed out in hard copy in front of him and may be listening over the telephone to the audio only stream. From the presenter's comments, it may be difficult to ascertain which page the presenter is discussing. The "page number" visual cue can solve this problem by triggering automatic action which reads the page number through the audio media stream. The participant who is listening over telephone (105, FIG. 1) may then receive this audio information and understand which page the presenter is on.

The "change presenter" visual cue may be used to alter the configuration so that a second person can present during the web conference. This may include muting the line of the original presenter and opening the line of the current presenter. It may also include turning the control of various aspects of the presentation over to the second presenter.

The "information" visual cue may be used to trigger the activation of various external links by the web conference server. For example, if the presenter wished to direct the participants to a particular website, the presenter could place the "information" visual cue in front of the web address of the site. The visual robot (130, FIG. 1) would then recognize the information visual cue and search in the visual area following the cue for the web address. The visual robot (130, FIG. 1) would then take the action of textually recognizing the visual address and activating it so that it became a link that the participants could click on to go to the website.

The "increase security" visual cue may be used to change the security settings of the web conference. For example, when an "increase security" visual cue is recognized by the visual robot (130, FIG. 1) on a presentation page, the visual robot (130, FIG. 1) may temporarily or permanently change the security settings of the web conference. These changes in security may include encrypting the various media streams (152, FIG. 1) to reduce the likelihood of third-party eavesdropping. It also may include erasing the copies of this portion of the presentation from the various participants' caches or hard drives to prevent unauthorized access following the web conference.

The "create to-do" visual cue may be used to open a to-do tool within the web conference which will assign and schedule various tasks to participants in the web conference. The "schedule" visual cue may interface with external calendaring systems to present and share all or a portion of the participants' schedules. This can be useful in creating a timeline for tasks to be done or for scheduling follow up meetings. According to one illustrative embodiment, the "schedule" icon pulls up a single calendar with all of the participants scheduled tasks displayed and identifies open time slots in which a meeting or a task could be accomplished.

The "social networking" visual cue could take a variety of actions including opening a hierarchical team organization application which allows for adjustments to responsibilities and hierarchal structure. The social networking visual cue may also open various external applications such as LINKEDIN® or FACEBOOK® to allow for a social network to be built or modified. The "provide feedback" visual cue may open an external third-party site which allows the participants to provide feedback to the presenter in an anonymous fashion.

The "brainstorm" visual cue may open a variety of brainstorming tools within the web conferencing system to allow the participants to generate a large number of ideas for a solution to a problem. For example, the brainstorming tool may allow the participants to define, redefine or split the problem into various components and give further explanation if needed. The group is then queried for their ideas and these ideas are recorded by the web conference system. The web conference system may also automatically categorize the ideas and allow all the ideas to be reviewed by the participants. The duplicate ideas and obviously infeasible solutions are then removed and a critical evaluation can be made of the brainstorming ideas. Thus, the brainstorming visual cue may activate a sequence of actions which take place over time and are dependent on various external variables.

FIGS. 3 through 7 show one illustrative example of a web conference application presenting a web conference presentation that includes visual cues to take automatic or semi-automatic action within the presentation. In the example shown in FIG. 3, the web conference is presented inside an internet browser (300). An address bar (305) shows the address of the web conference. A menu bar (310) shows visually and textually the various actions which can be taken within the web conference application. The content of the web conference is shown in the display box (315). The display box (315) includes a number of textual lines as well as a "configure audio" visual clue (335).

On the right-hand side of the web conference display, a video feed (320) of the presenter is displayed. The participants in the web conference are shown in a participants' box (325). In this illustrative embodiment, the participants are Paul, Sara, Robert and Matt. Paul is the moderator for this presentation and is presenting the current content. The icon to the left of Paul's name shows a star and a cone. The star shows that he is the moderator of the web conference and the cone shows that he is the current presenter within the conference. The icons to the left of Sara, Robert and Matt do not have a star or a cone, indicating that they are, at this stage, only participants in the web conference. In the lower right-hand portion of the screen, a visual robot actions box (330) shows the visual cues that the visual robot has identified from the display box (315). In this illustrative embodiment, the visual robot has identified the "configure audio" visual clue (335). The visual robot actions box (330) shows the action which is being applied as a result of identifying this visual cue. In this illustrative embodiment, the visual robot has configured the audio in presentation mode. This may include opening the microphone for the presenter (Paul) to speak to the participants (Sara, Robert and Matt) while muting their lines to prevent unnecessary background noise.

In this example, Paul is the manager in an interior design company and has called the web conference to discuss the Asia Interiors rollout. Paul has four items that he wishes to discuss during the presentation: the target rollout date of the Asia Interiors effort; the initial products which will be included in the Asia Interiors rollout; the pricing and competition in the rollout market; and following up the presentation to assign tasks and build his team for the projected rollout.

Figure 4:
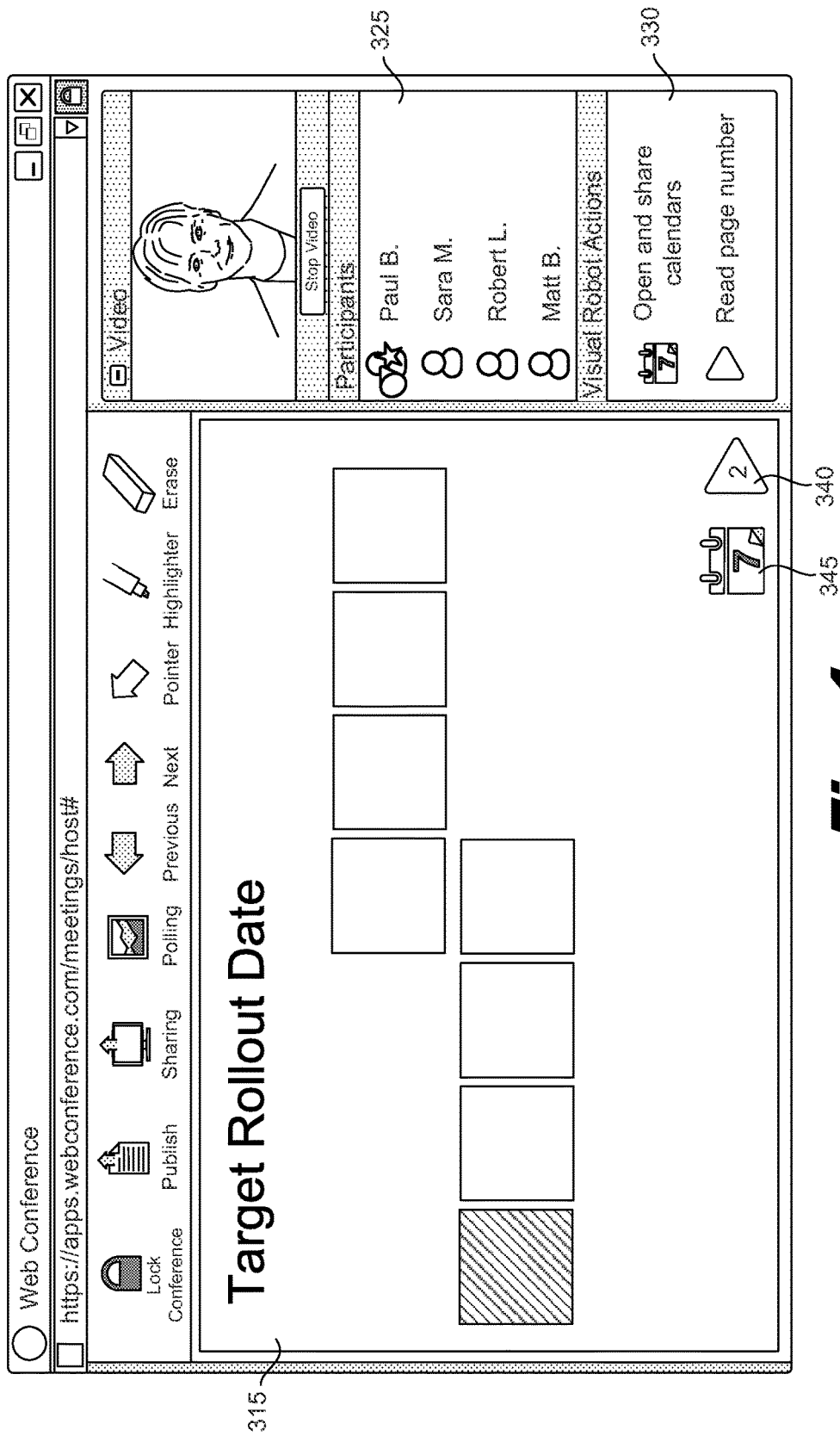

FIG. 4 shows a second slide in Paul's presentation. Paul continues to be both the moderator and the presenter. Paul has included in the second slide two visual cues (345, 340). The first visual cue (345) is a "scheduling" visual cue and the second visual cue is a "page number" visual cue (340). As shown in the visual robot action box (330), the visual robot has identified the scheduling visual cue (345) and the page number visual cue (340). The visual robot is taking actions during this portion of the presentation based on those visual cues. The scheduling visual cue (345) triggers the visual robot to open and share the calendars of the various participants. As discussed above, this may include opening various third-party applications such as LOTUS NOTES®, MICROSOFT® OUTLOOK® or other calendaring programs and sharing or merging the various tasks on the participant's calendars so that a target rollout date can be selected The visual robot has also identified the "page number" icon (340). As discussed above, the "page number" icon (340) can trigger a number of functions including reading the page number contained within the visual cue through the audio stream. This will allow those who are listening only to the audio portion of the presentation to identify which page Paul is using for this portion of the presentation.

Figure 5:
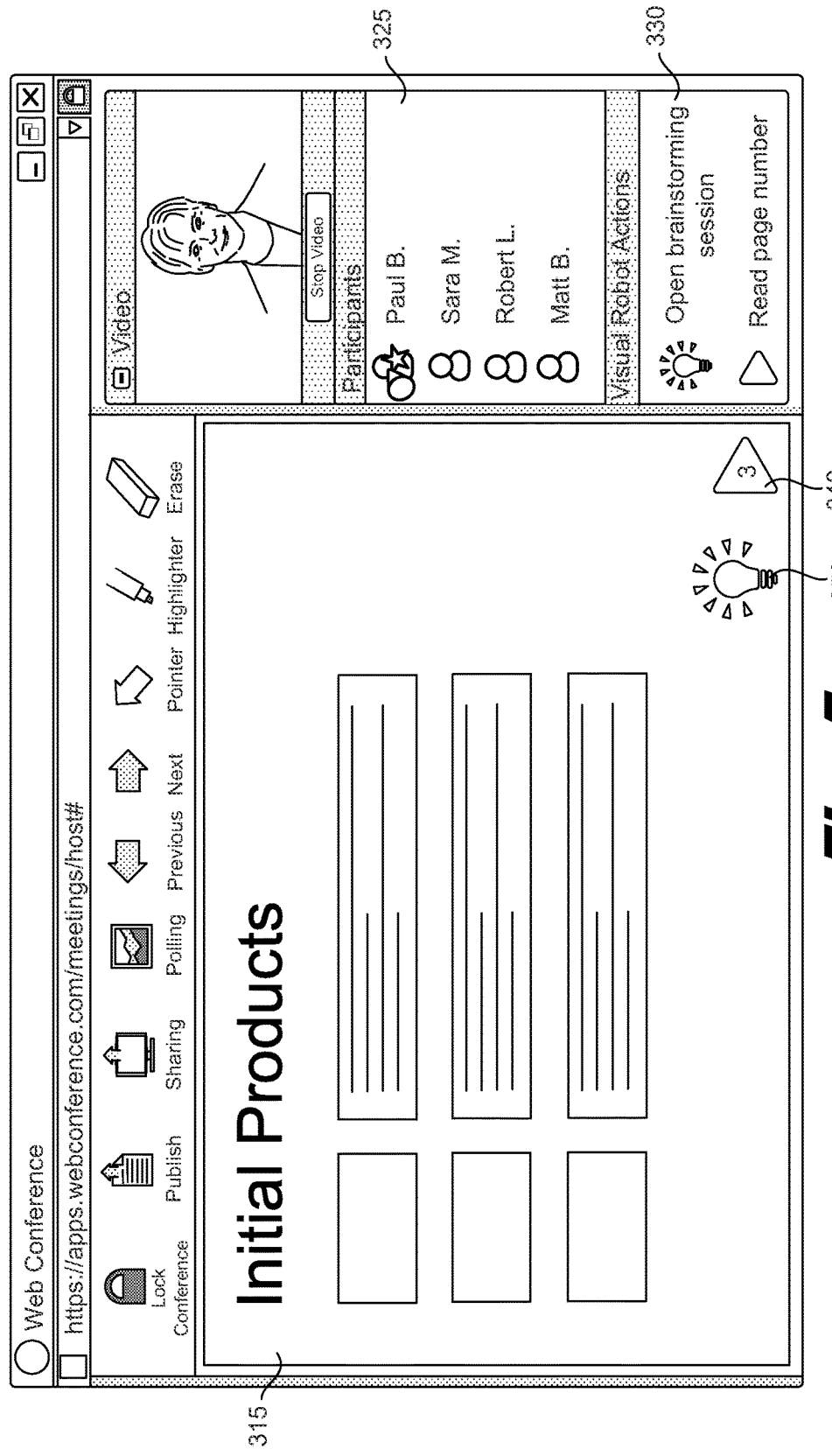

FIG. 5 shows a third page in the presentation in which Paul is presenting initial products for the rollout. Paul has included visual cues (350) and (340) at the bottom right hand portion of the slide. The first visual cue is the "brainstorming" visual cue (350). As discussed previously, the "brainstorming" visual cue (350) may trigger a number of actions within the web conference including opening brainstorming tools. For example, a white board feature may be activated. The participants' audio lines may also be opened so that they can communicate with each other regarding various options or alternatives for the initial products. An instant messaging service may also be opened to allow for textual interaction between the various participants. In some embodiments, portions of the participants' screens which display outside applications may be shared so that they can communicate more effectively their ideas for the initial products. This page of the presentation also includes the page number icon (340). As discussed previously, this page number icon (340) may be used to read the page number over the audio line that is currently being displayed.

Figure 6:
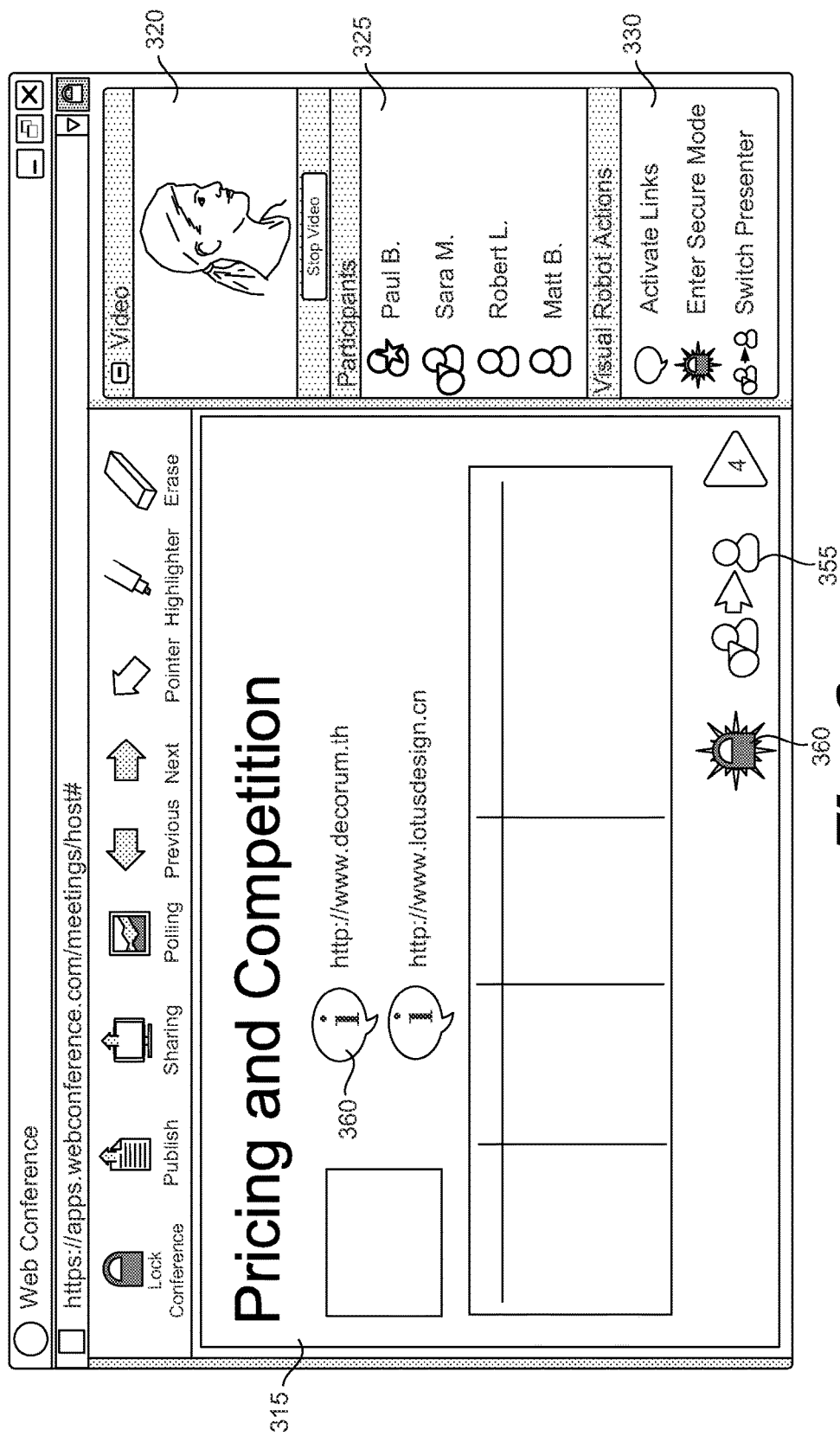

FIG. 6 shows the fourth page of the presentation. This page of the presentation describes the pricing and competition for the rollout. Paul felt that this portion of the presentation should have higher security than the previous portions and, consequently, has included the "change security" visual cue (360) in this page of the presentation. As discussed previously, a variety of actions could be taken as a result of the visual robot identifying the "change security" visual cue (360). For example, the visual robot may take actions to increase the encryption of the various data streams, eliminate stored copies of the presentation within the caches or hard drives of the networked devices and take steps to prevent intrusion by third parties during the web conference. In some embodiments, the secure mode may require the participants to enter a pass code or speak a password to allow for voice identification of the participants. The secure mode may also disable the instant messaging service or other functionality within the web conference application.

Paul also wanted to turn over the presenter role to Sara for this portion of the presentation. To do this, Paul included the change presenter visual cue (355) at the bottom of the page. As discussed above, the "change presenter" visual cue (355) may trigger a number of actions within the web conference application. For example, the video feed may be switched from Paul's camera to Sara's camera to provide an image of Sara as she is giving the presentation. The icons next to the participants also change, with the speaking cone being switched from Paul to Sara.

In this portion of the presentation, Sara discusses the current pricing of the company's products, the competition's product offerings and the competition's pricing. To give the participants further information about the competition, Sara has included two links to competitors' websites that give pricing and advertising information. In front of these links Sara has included "information" visual cues (360). The visual robot recognizes the "information" visual cues (360) and searches for text following the information visual cue. The visual robot then uses textual recognition algorithms to extract the address from the text and activates a link for the various participants to click on at their discretion. Alternatively, Sara may activate one or more of the links to temporarily replace the current slide with the competitor's website.

Figure 7:
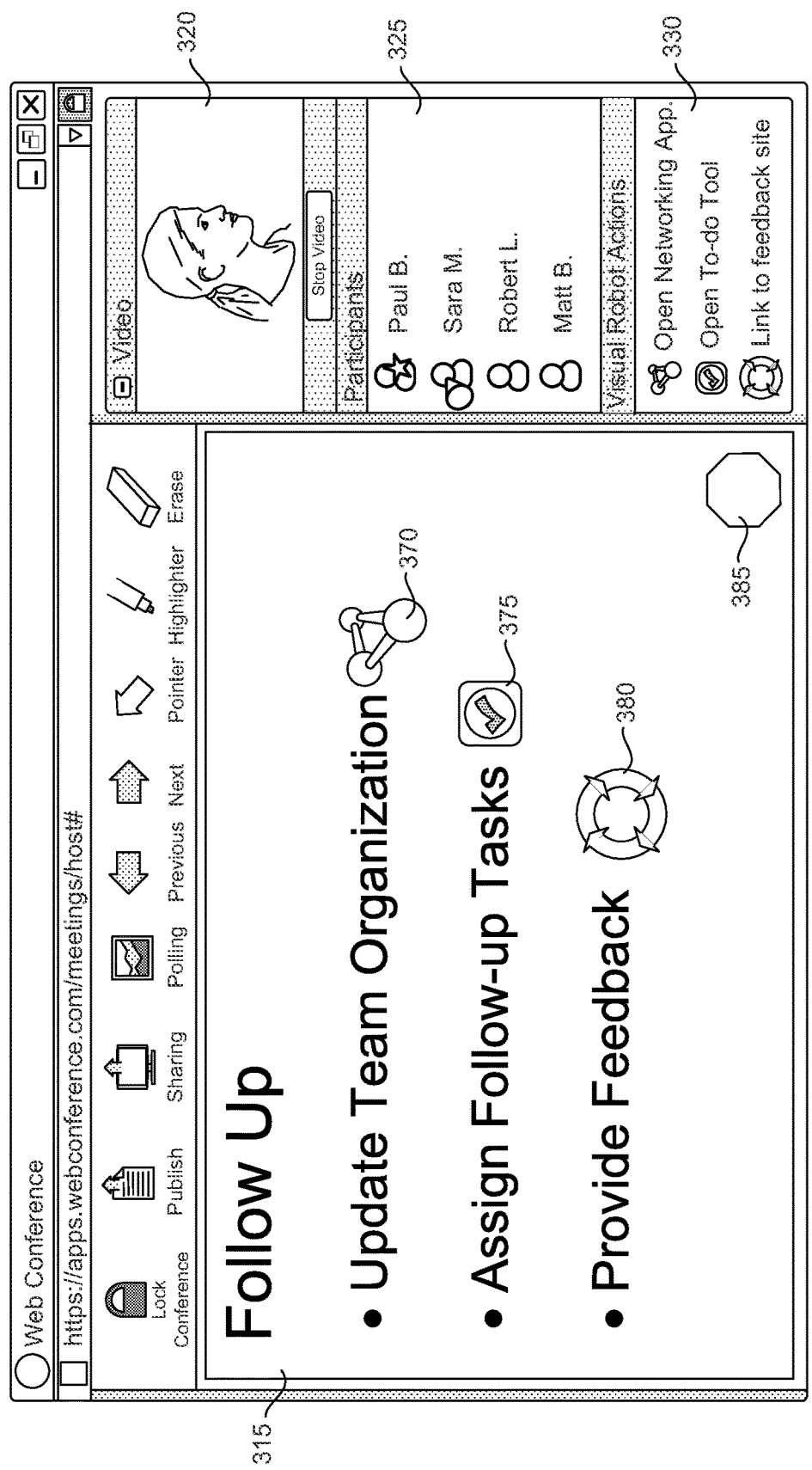

FIG. 7 shows the final page of the presentation. Sara is continuing to present the follow-up items to conclude the web conference. Sara has included a "social networking" visual cue (370), the "to-do" visual cue (375) and the "provide feedback" visual cue (380) following the bullet pointed descriptions in the upper portion of the slide. Sara has also included in the lower right-hand portion of the slide a "stop" visual cue (385).

As discussed above, the "social networking" visual cue (370) can trigger a number of actions which can allow Sara to update the team organization including the members within the team and their interrelationships with each other. The "to-do" visual cue (375) may open a to-do tool and/or external programs to allow specific tasks to be assigned among the various members of the team. After updating the team organization and assigning following tasks, the team members are directed to a third-party feedback site by the visual robot in response to the "provide feedback" visual cue (380). At the third party website, the participants can anonymously provide feedback with regard to the presentation, the project, or other participants.

The "stop" visual cue (385) may trigger a number of actions when recognized by the visual robot. In this particular embodiment, the visual robot simply presents a question to the moderator asking if the visual robot should proceed to close down the website and stop the media streams.

A wide variety of methods can be created to generate and use visual cues within a web conference environment. For example, the visual cues may be dynamically dragged onto the presentation page during the teleconference to take a given action or series of actions. As shown above, the visual cues may trigger a wide variety of actions including actions which are entirely automatic. In other embodiments, the actions may be semi-automatic and require an action by the participant to continue with the action. The action may also activate software tools internal to the web conference server, open an interface with external applications, or take other actions. The visual robot will typically be capable of performing textual recognition and audio generation in addition to visually recognizing the icon portion of the visual cue. The visual cues presented in this specification are only illustrative examples. Additional visual cues may be generated a number of ways and may be adapted to the needs of a given organization or individual. New visual icons can be created to adapt the web conferencing capabilities to new technologies or procedures.

Figure 8:
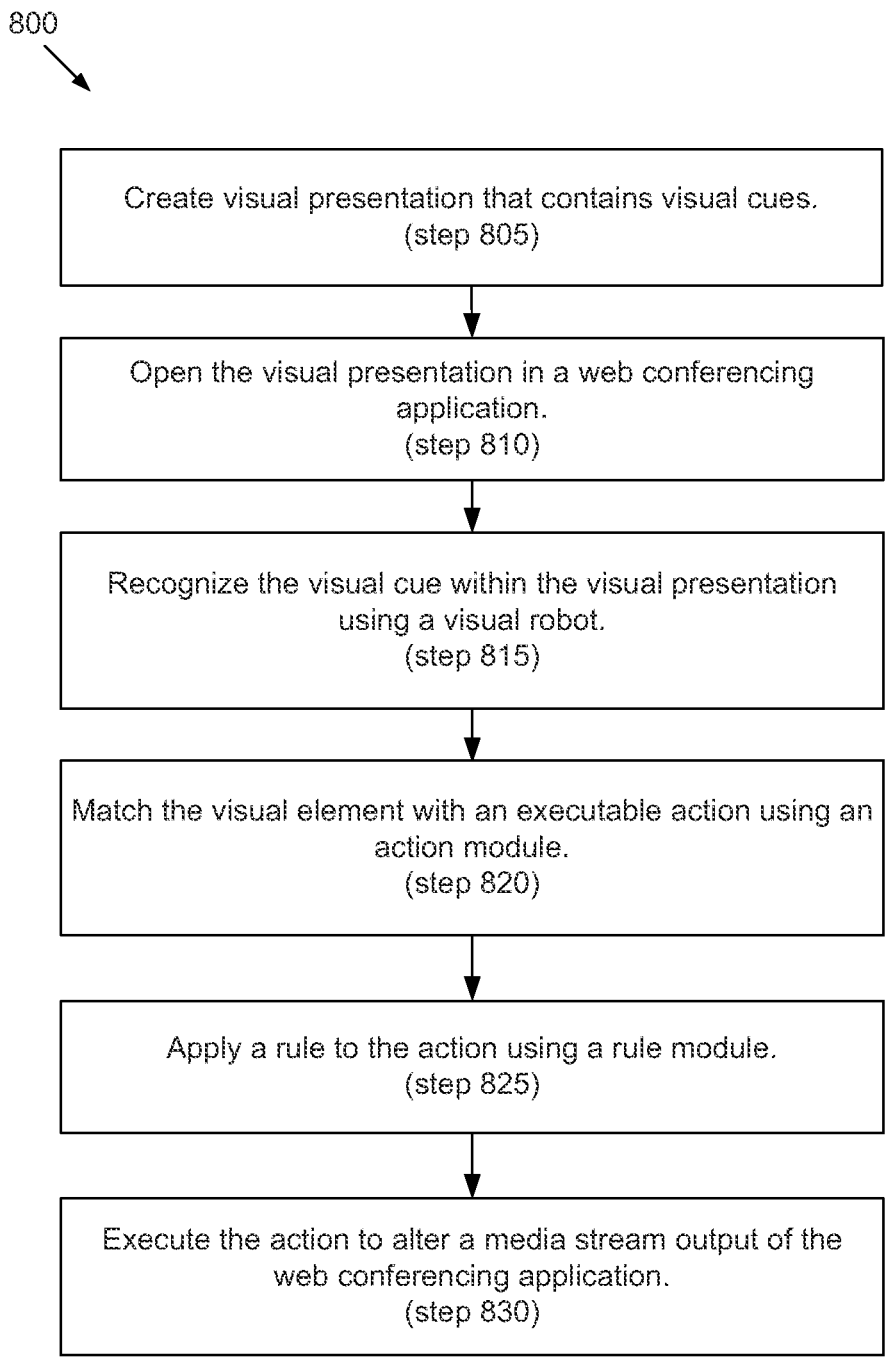
FIG. 8 is a flowchart showing an illustrative method for inserting and using visual cues in a presentation, according to one exemplary embodiment of principles described herein.

FIG. 8 is a flowchart of an illustrative method for inserting and using visual cues in a presentation. In a first step, a visual presentation is created which contains visual cues (step 805). As described above, the visual cues may be contained within a visual cue tool bar. The desired visual cue may be selected and placed within the visual presentation. Additionally or alternatively, a visual cue and associated action may be created to suit the needs of the presenter or organization. The visual presentation is then opened in a web conferencing application (step 810). As the presentation progresses, a visual robot recognizes the visual cues as they are presented (step 815). The visual cue is then matched to an executable action using an action module (step 820).

If there are any applicable rules for apply the action, the rules are applied using a rule module (step 825). For example, the rule module may have a number of conditions which must be satisfied prior to the execution of an action. The rules may designate a sequence or time at which the action should be taken. For example, when the visual cues follow bullet points, the rule may require that the actions associated with the visual cues be executed in the sequence they are presented. The rules may also require that an action occur only when the web conferencing application is in a particular state or range of states. For example, the rule may state that the action associated with the "change presenter" visual cue be executed only when there are two or more participants in the presentation.

The action is then executed according to any applicable rules to alter a media stream output of the web conferencing application (step 830). As discussed above, in addition to altering the media stream output, the action may also include activating external applications, changing the configuration of connected devices, or other actions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A system for implementing visual cues in web conferencing comprising:
    a slide presentation comprising a plurality of pages;
    a visual cue comprising a graphical icon embedded, by a user during creation of the slide presentation, in at least one page of the slide presentation;
    a web conferencing server comprising at least one processor presenting the at least one page of the slide presentation which comprises the visual cue, the visual cue being linked with at least one executable action;
    a visual robot operated by the web conferencing server, the visual robot to:
        automatically recognize the visual cue when the at least one page of the slide presentation is displayed in a web conference and wherein the visual robot is to automatically recognize the visual cue without the icon of the visual cue being manually selected by a user during the web conference;
        associate the visual cue with the at least one executable action;
        automatically execute the at least one executable action; and
        automatically erase copies of the at least one page of the slide presentation comprising the visual cue from a storage device on a number of computing devices associated with a number of participants of the web conference upon completion of the slide presentation when the visual cue is an increase security visual cue that increases security settings of the web conference for the at least one page of the slide presentation.

2. The system of claim 1, in which the visual robot automatically executes the executable action.

3. The system of claim 2, in which the executable action comprises automatically configuring audio inputs in the system, the audio input of a presenter being activated and the audio input from other participants being muted.

4. The system of claim 3, in which the executable action further comprises selecting a video feed generated by the presenter and broadcasting the video feed over the web conferencing server.

5. The system of claim 1, in which the executable action alters security features of the system.

6. The system of claim 1, in which the execution of the executable action is contingent on an authorizing action taken by a presenter or other participant.

7. The system of claim 1, in which the visual cue comprises an icon component and a textual component, the visual robot recognizing the icon component and using optical character recognition to convert the textual component into computer readable text.

8. The system of claim 7, in which the visual cue comprises a page number icon and page number, the visual robot being to graphically recognize the page number icon, use optical character recognition to convert the page number into computer readable text, and audibly read the page number.

9. The system of claim 1, in which the executable action comprises opening an interlace with external programs and data stored on participants' local computing devices.

10. The system of claim 9, in which the executable action comprises retrieving and consolidating data stored on participants' local computing devices.

11. The system of claim 9, in which the executable action comprises creating a link to an external web site.

12. The system of claim 1, in which the executable action comprises opening tools within a web conferencing application.

13. The system of claim 12, in which the executable action comprises one of: opening a polling tool, opening a brainstorming tool, and opening a to-do tool.

14. The system of claim 1, in which the visual robot comprises:
    a visual recognition engine to recognize graphical and textual components within the slide presentation;
    an action module which stores executable actions associated with specific graphic elements; and
    a rule module which stores rules for applying the executable actions.

15. The system of claim 1, in which the visual cue is displayed to all participants in the web conference.

16. The system of claim 1, in which the visual cue comprises a static graphical icon placed within pages of the slide presentation.

17. The system of claim 1, further comprising a platform independent visual cue tool bar, the visual cue tool bar comprising visual cue icons to be selected and dragged into the slide presentation.

18. The system of claim 1, further comprising a rule module to designate a specific state of the system during which the executable action is permitted to occur.

19. The system of claim 1, further comprising a visual robot actions box displayed to participants in the web conference, the visual robot actions box to display visual cues that the visual robot has identified in the slide presentation.

20. A method comprising:
embedding, by a user during creation of a slide presentation, a visual cue comprising a static graphical icon on a page of the slide presentation;
presenting the slide presentation during a web conference;
recognizing the visual cue within the slide presentation using a visual robot operated by a web conferencing server during the presentation of the slide presentation, wherein the icon of the visual cue is not manually selected by a user during the presentation of the slide presentation as part of recognizing the visual cue;
matching the visual cue with an executable action using an action module;
automatically executing the action to alter a media stream output of a web conferencing application hosted on the web conferencing server; and
deleting with the web conferencing server and from a memory device of a number of computing devices associated with a number of participants of the web conference, a portion of the slide presentation upon completion of the slide presentation;
wherein the deletion of the portion of the slide presentation automatically occurs when the visual cue within the portion of the slide presentation is an increase security visual cue that increases security settings of the web conference for at least that portion of the slide presentation.

21. The method of claim 20, in which execution of the action is contingent on authorization by the user.

22. The method of claim 20, in which execution of the action comprises selectively switching from one input stream to a second input stream.

23. The method of claim 20, further comprising using optical character recognition to convert a portion of the visual presentation designated by the visual cue into computer readable text.

24. The method of claim 20, further comprising applying a rule to the action using a rule module, the execution of the action being contingent on fulfilling the conditions of the rule.

25. The method of claim 20, further comprising displaying the visual cue as part of the slide presentation to all participants in the web conference.

26. The method of claim 20, further comprising:
selecting the visual cues from icons in a visual cue tool bar; and
dragging the visual cue from the visual cue tool bar into the slide presentation.

27. The method of claim 20, further comprising visually scanning, with the visual robot, slides in the slide presentation for static visual cues imbedded in individual slides by making an analysis of presented pixels or vector graphics in the slides.

28. The method of claim 20, further comprising:
periodically capturing a screen shot of a displayed slide within the slide presentation; and
analyzing the screen shot by the visual robot to identify the visual cue within the slide presentation.

29. The method of claim 20, further comprising dynamically dragging the visual cue into a currently displayed page of the slide presentation during a web conference to initiate a specific action by the visual robot.

30. A computer program product for recognizing and taking action based on visual cues in a web conferencing application, the computer program product comprising:
a computer readable storage medium having computer readable program code embodied therewith, the computer readable program code comprising:
computer readable program code to automatically recognize a visual cue within a page of a visual presentation using a visual robot when the page is displayed in a web conference, the visual cue comprising an icon;
computer readable program code to match the visual cue with an executable action using an action module, without the icon of the visual cue being manually selected by a user during presentation of the visual presentation in the web conference;
computer readable program code to automatically execute the action when the page is displayed to alter a media stream output of the web conference; and
computer readable program code to automatically delete copies of the page of the visual presentation from a number of user computing devices communicatively coupled to a computing device initiating the web conference when:
the visual cue within the page of the visual presentation is an increase security visual cue, and
security settings associated with the page of the visual presentation are changed based on the increase security visual cue;
wherein the deletion of the copies of the page of the visual presentation from a number of user computing devices is done by the computing device initiating the web conference upon completion of the visual presentation.

* * * * *